Sept. 24, 1929.  M. O. SCHUR  1,729,312
DOSER
Filed July 17, 1925  4 Sheets-Sheet 1
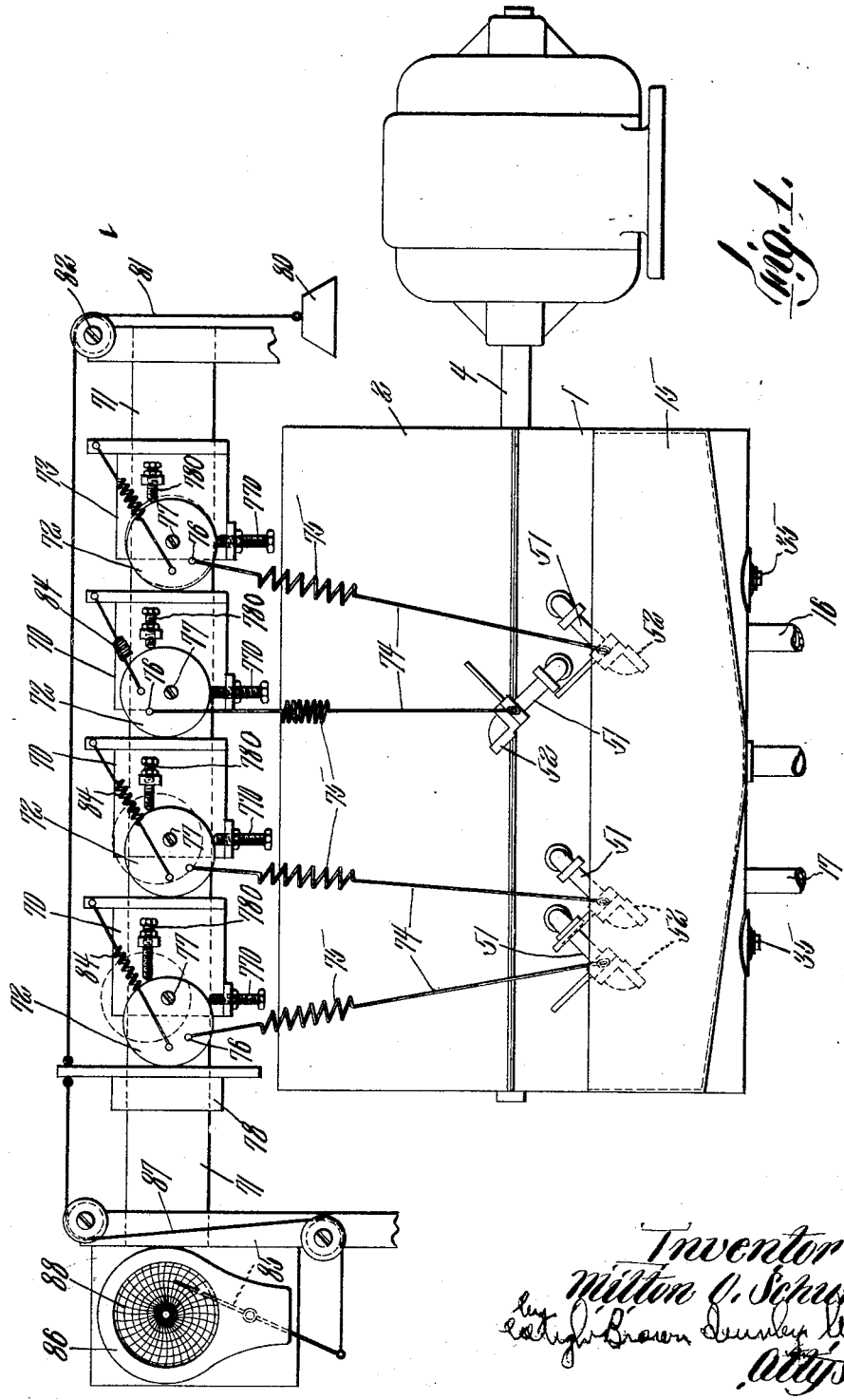

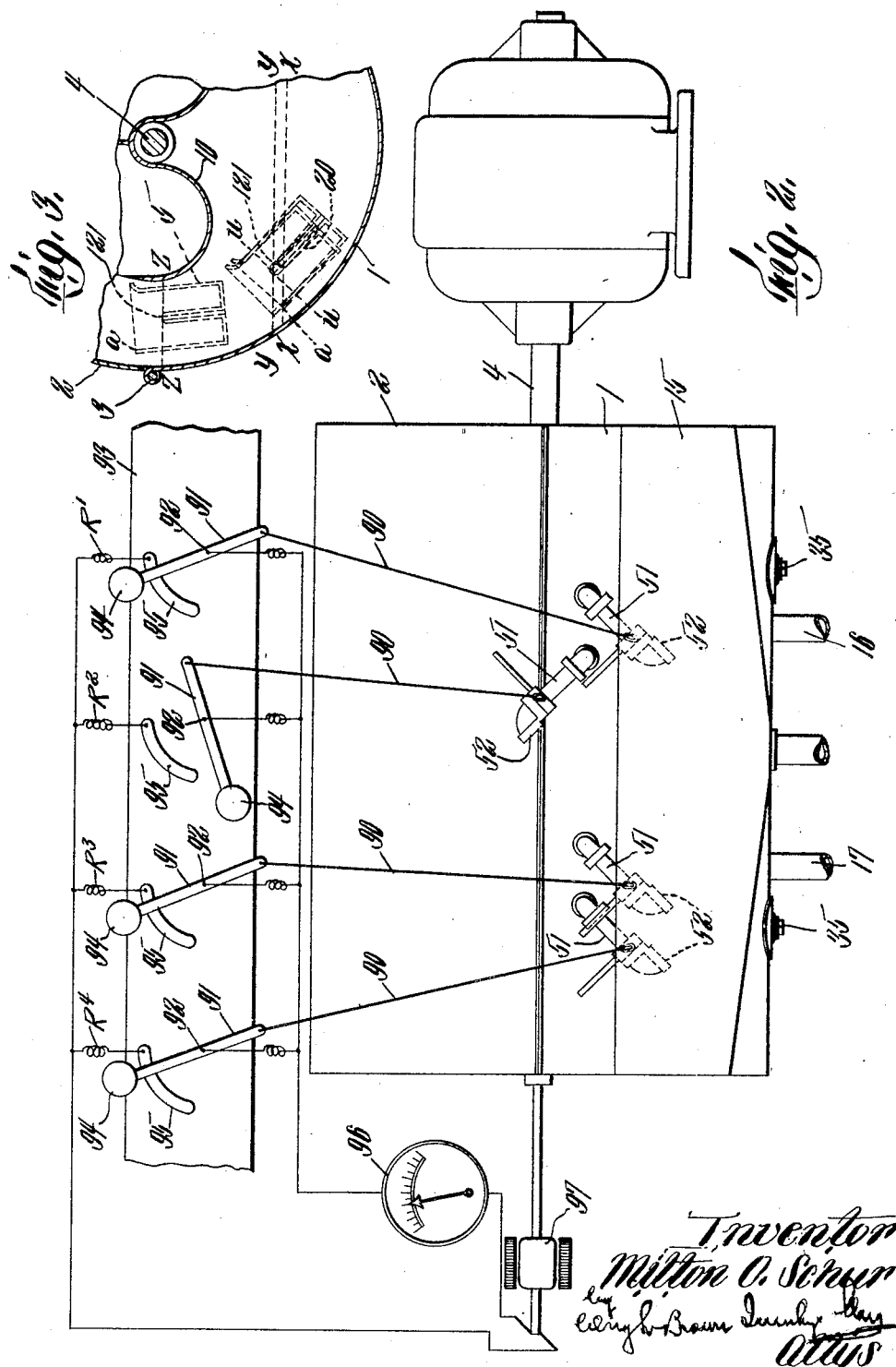

Sept. 24, 1929.　　　M. O. SCHUR　　　1,729,312
DOSER
Filed July 17, 1925　　　4 Sheets-Sheet 3
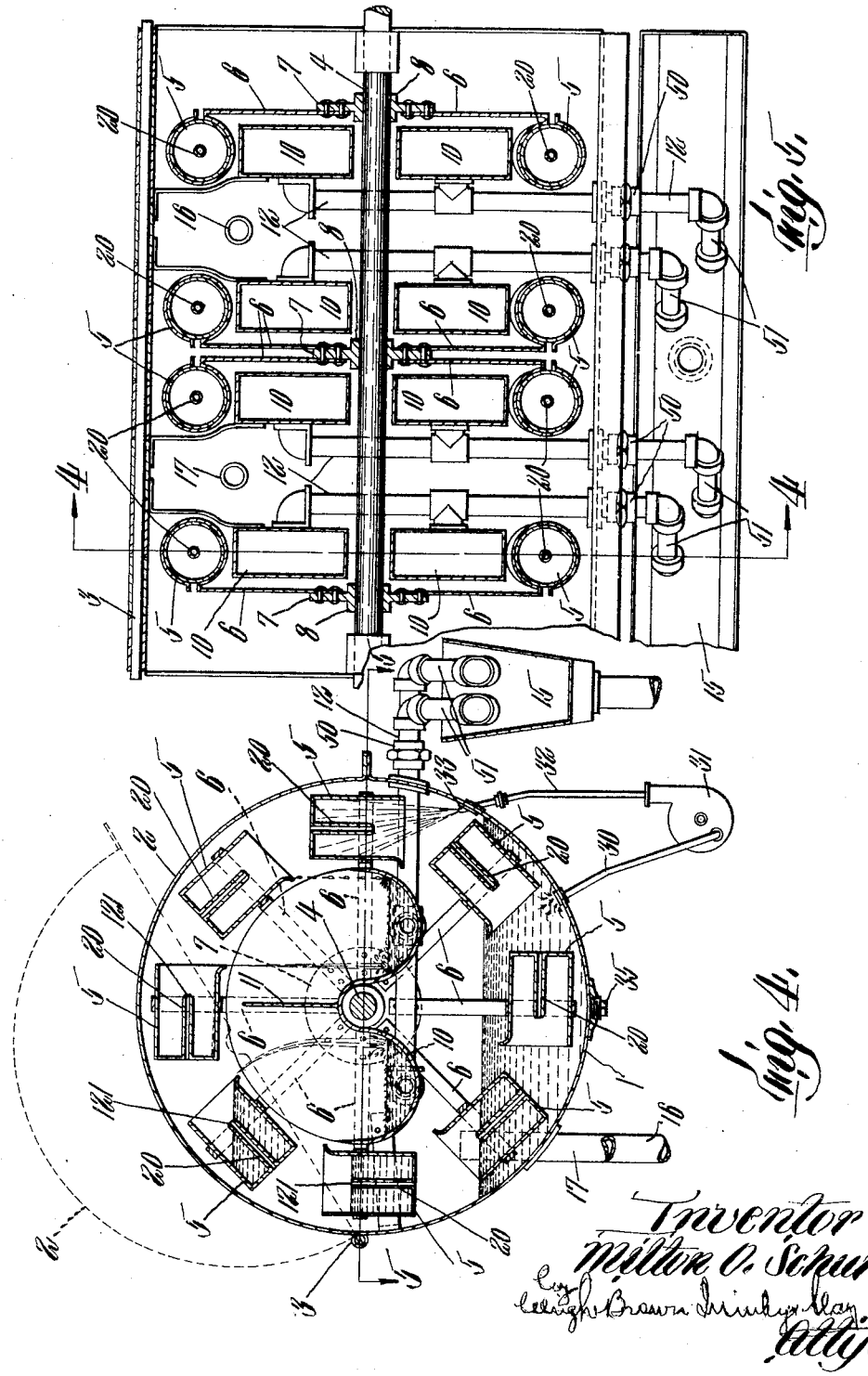

Sept. 24, 1929. M. O. SCHUR 1,729,312
DOSER
Filed July 17, 1925 4 Sheets-Sheet 4
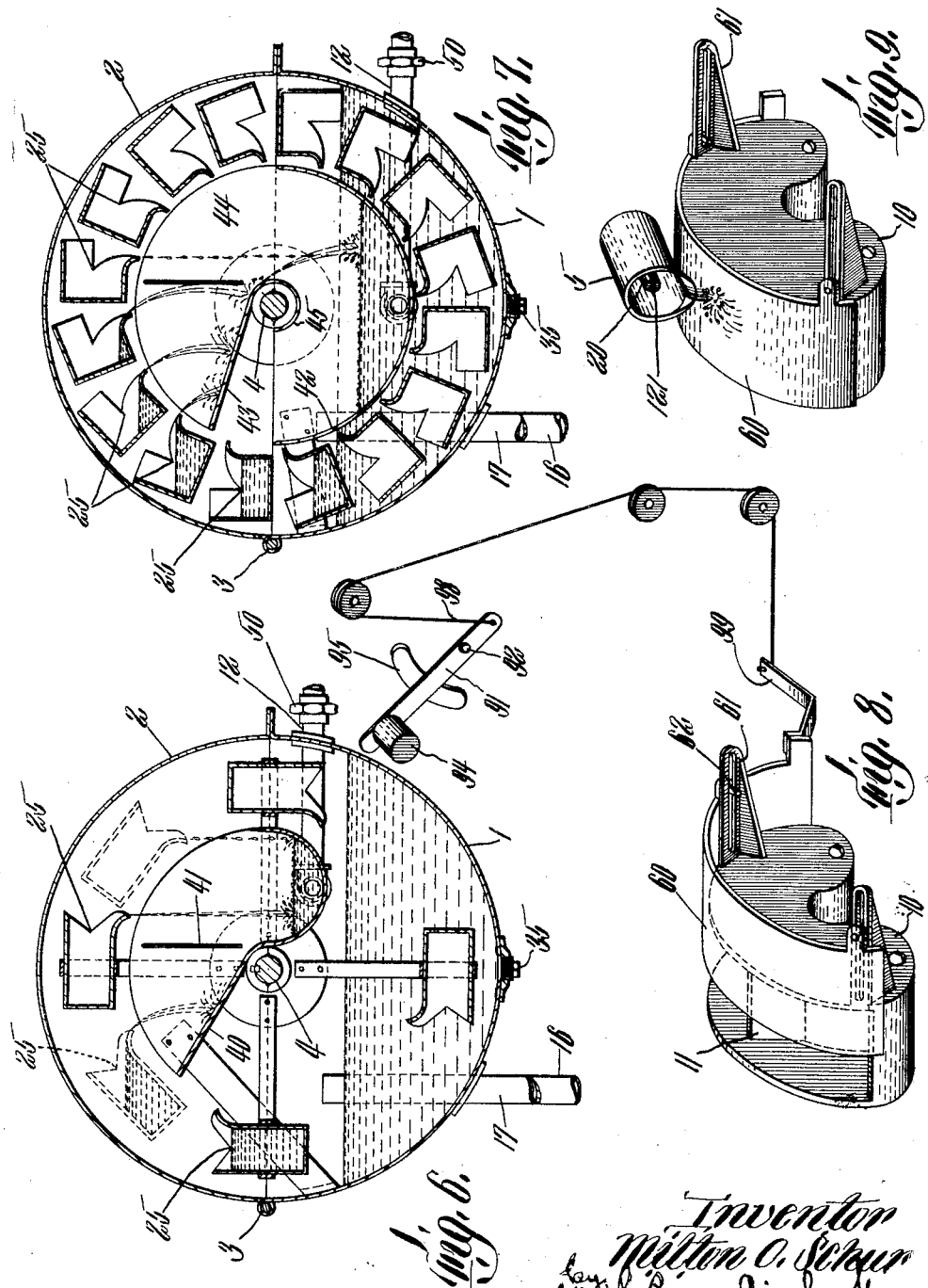

Patented Sept. 24, 1929

1,729,312

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

DOSER

Application filed July 17, 1925. Serial No. 44,227.

This invention relates to mechanism for measuring and discharging liquids and has been more particularly designed for handling relatively small quantities of corrosive liquids or those containing sediment or scale, such liquids, for example, as caustic soda sirup and bleach liquors, as used in paper mills, where other methods employed for measuring liquids can not be successfully used. In mechanism of the doser type the liquid is scooped up in dippers from a container for the liquid and then discharged from the dippers, the amount of liquid dispensed depending on the capacity of each dipper and the number of times it is discharged in a given time interval.

One of the drawbacks of dosers as heretofore constructed is the fact that changes in the level of liquid in the supply container cause changes in the amount picked up at each raising of a dipper, so that unless this liquid level be maintained substantially constant the rate of discharge may vary considerably from that normally corresponding to a given dipper capacity and rate of emptying.

One of the objects of the present invention is to provide a construction wherein the level of liquid in the supply container may vary quite considerably without having any effect on the rate of discharge.

A further feature of the invention relates to the manner of assembling units in a single mechanism and controlling them in such a manner that a wide variation by definite small increments in the rate of discharge may be produced without varying the speed at which the mechanism is driven.

A further feature of the invention relates to means for automatically indicating, and if desired, recording the particular rate of discharge for which the mechanism is at any time adjusted and by which, if desired, variations in the rate of operation of the machine are also effective in giving an indication of the rate of discharge.

A still further feature of the invention resides in means for rendering any desired unit or units inoperative by which means the rate of discharge may be regulated.

Further objects and advantageous constructional details will appear from a more complete description of embodiments thereof shown in the accompanying drawings in which Figure 1 is a front elevation of the mechanism showing a mechanical recorder in connection therewith.

Figure 2 is a similar view showing an electrically operated indicator.

Figure 3 is a diagrammatic view illustrating the action of a dipper in liquids of different levels.

Figure 4 is a vertical section through the mechanism along the line 4—4 of Figure 5.

Figure 5 is a fragmentary horizontal section on line 5—5 of Figure 4.

Figures 6 and 7 are views similar to Figure 4, but illustrating modified constructions.

Figure 8 is a detail in perspective showing a baffle mechanism for rendering any desired unit or units inoperative, the baffle being shown in an intermediate position.

Figure 9 shows in perspective the action of the baffle when in operative position.

Referring first to the construction illustrated in Figures 3, 4 and 5, 1 indicates a semicylindrical receptacle having a cover 2 hinged thereto at 3. Extending axially through this receptacle is a horizontal shaft 4 about which are arranged in circular formation a series of dippers 5. As shown these dippers are fixed to rotate with the shaft 4 being carried at the outer extremities of arms 6 which are fixed at their inner ends radially to disks 7 having hubs 8 fixed to the shaft 4, the dippers thus being arranged successively to dip up liquid from said receptacle and then discharge it as the shaft 4 is rotated, the open sides of the dippers facing in the direction of rotation. There may be any desired number of series of dippers each arranged in one plane perpendicular to the axis of the shaft 4 and each series containing as many dippers as may be desired. In connection with each series of dippers is a receiving funnel 10, which, as shown in Figure 4, may extend over and depend on either side of the shaft 4, and for the purpose of preventing splashing of the liquid discharged thereinto from the dippers, it may be provided with one or more baffles 11. From the lower portions of these funnels may extend the outlet pipes 12 through which the liquid charged into the funnels may be passed out to a suitable receptacle or discharge trough 15.

The liquid to be measured may be supplied to the receptacle 1 as through a supply pipe 16, and an overflow pipe 17 may be provided to limit the depth to which the liquid may rise within the receptacle.

Each of the dippers 5, according to this invention, is so formed that it dips up the same quantity of liquid from the receptacle even though the level of the liquid therein may vary considerably. This is accomplished by providing an overflow for each of the dippers so situated that within certain limits of liquid level in the receptacle it determines the level of the liquid to be retained in each dipper, irrespective of the height of the dipper walls therebeyond. In the form shown in Figures 3, 4 and 5 this overflow comprises a tube 20 arranged axially within each dipper, the dippers being shown as of circular cross section, each pipe being open at its top as at 121 and located in a plane dividing the dipper into two symmetrical parts and parallel to the shaft about which the dippers turn. The end 121 of the overflow pipe is sufficiently below the top of the dipper so that the horizontal plane representing the lowest level of the liquid in the receptacle 1 passes through the overflow and the lower edge of the open end of the swinging dipper. This action of the overflow may be better understood by reference to Figure 3, in which in the lowest dotted line position of the dipper the outer edge $a$ is lower than the upper end 121 of the overflow, hence this lower edge will determine the level of the liquid in the dipper, which, when the dipper is raised to a substantially horizontal position, will be below the outlet 121, hence the dipper is not operative to pick up a maximum quantity of liquid at this low level indicated by the dotted line $x$—$x$. As the dipper rises, however, the edge $a$ is brought up into horizontal alinement with the outlet 121 so at the line $y$—$y$ it is on the level of the outlet 121. This level $y$—$y$ then becomes a low limit of the level of the liquid at which the amount picked up by the dipper will be uniform. As the level of the liquid in the receptacle is raised to the dotted line position $z$—$z$, it will be seen that the upper edge $a$ of the dipper is considerably higher than the overflow 121, but the overflow 121 then determines the level of the liquid within the dipper in the same manner that it did when the level of the liquid was at the line $y$—$y$. As between these positions the outlet 121 is in an axis of symmetry of the dipper, the amount picked up and retained by the dipper is the same for any liquid level between them, the volume between the level $y$—$y$ and the plane $u$—$u$ perpendicular to the outlet pipe 20 at the overflow 121 being exactly equal to the empty volume between the plane $u$—$u$ and the plane $y$—$y$ above the level of the overflow 121, this relationship being maintained from the minimum level $y$—$y$ upwardly to above the line $z$—$z$. While the dippers are shown of circular cross section, they might be of any prismoidal contour, being of uniform cross sectional area throughout the liquid measuring portions.

In place of forming the overflow by means of a central tube projecting upwardly axially of the dipper, the same result may be produced by forming one or more notches in the sides of the dipper, as illustrated in the construction shown in Figures 6 and 7 in which each of opposite sides of the dipper is shown as formed with a V-shaped notch 25, the apex of which lies in the plane of symmetry of the dipper parallel to the shaft about which the dippers turn.

Where the overflow is formed by a pipe as at 20 arranged axailly in the dipper, its accuracy is not conditioned upon its being placed with its central plane arranged perpendicularly with the shaft 4 as in the case where the overflow is formed by side notches, as shown in Figures 6 and 7. It is, however, a more difficult construction to maintain in proper condition, particularly where liquids containing sediment or scale are encountered which would be liable to plug up the small opening through the overflow pipe.

In view of the fact that this mechanism is particularly intended to handle liquids of this general nature, or liquids which are corrosive and can not be well handled by other types of dispensing apparatus, provision may be made for washing out the sediment or scale, or other foreign matter, so that the amount measured by each dipper may be more accurately maintained at a definite value. For this purpose provision may be made for cleaning out each dipper just prior to its dipping beneath the liquid in the tank 1. As shown in Figure 4 this may be done by withdrawing liquid from the tank 1 through a pipe 30 and projecting it by means of a centrifugal pump 31 through a pipe 32 and nozzle 33 directed upwardly, so that the jet issuing therefrom strikes forcibly within the inverted dipper on its way to take up a portion of the liquid from the receptacle 1. At 35 in the base of the receptacle is shown a plug by which the sediment and scale as it settles in the bottom of the receptacle may be removed from time to time as may be necessary.

In Figures 6 and 7 somewhat different forms of receiving funnels for the liquid discharged from the dippers have been indicated. In Figure 6 this funnel extends below the shaft 4 on one side only, the other side being inclined upwardly to form a floor 40 to receive the liquid initially discharged from each dipper, there being a baffle 41 which aids in preventing splashing of the liquid from the funnel. In Figure 7 the funnel is shown as a semi-cylindrical container 42 extending beneath the shaft 4 and having a floor member 43 extending between cylindrical end plates 44 projecting over and partially surrounding the shaft 4, as shown at 45. This funnel construction is particularly suitable for the dipper construction shown in Figure 7, the dippers being individually shallow and arranged closely together.

The amount of liquid discharged may be regulated by varying the speed of rotation of the shaft 4, but preferably in most instances, it is accomplished by varying the number or capacity of the dippers in each series, and rendering as many as desired operative at one time, while maintaining the rotation of the shaft 4 at a substantially constant rate. Of course, variations in the number and capacity of the individual dippers operative and variation of the rate of rotation of the shaft might be used in combination if desired.

A convenient arrangement for many purposes and one in which variations in quantity discharged may be varied by definite small increments may be produced by arranging the dippers in such a manner that each series has a capacity differing from the adjacent series by a power of 2, that is, the successive series may have the relative capacities of 1, 2, 4, 8, 16, etc. In a combination of five such series it is possible to vary the flow from 1 to 32 volumes in a given unit of time by increments of one volume with a constant speed of rotation of the shafts, this being done by utilizing various combinations of series to give the desired total unit flow, the other series being rendered inoperative to deliver liquid.

Various means may be provided for selectively rendering certain of the series inoperative to discharge liquid from the receptacle. One of these is illustrated in Figures 1, 2, 4 and 5. As therein shown each of the pipes 12 extends out through one side wall of the receptacle 1, and carries at its outer end a suitable valve, a simple form of which, as shown, comprises a union 50 made up sufficiently tight with each pipe 12 to prevent leakage but sufficiently loose to permit a leg 51 to be lowered into the trough 15 or raised upwardly therefrom to such a point that its outlet 52 is above the level of the liquid which may be retained within the funnels into which the dippers discharge. When any of these legs is raised upwardly sufficiently so that its discharge end is above the level of the liquid in the corresponding funnel no discharge therefrom can take place, the liquid in excess of this discharge into the funnel, flowing thereover and returning into the receptacle 1.

Another simple form of mechanism which may be used to render any desired series of dippers inoperative is shown in Figures 8 and 9 in which each of the funnels is provided with a cover 60 which may be moved bodily thereover, as shown in Figure 9, so that the liquid from the dippers discharges on its upper face and is thus caused to flow back into the receptacle, or which may be moved laterally to uncover the funnel in order to permit the liquid to be discharged thereinto. The cover or baffle is shown in partly open position in Figure 8. In order to support it the funnel may be provided with outwardly extending brackets 61 slotted for the reception of guide pins 62 projecting downwardly from the cover 60. Both of these mechanisms are actuable to adjust the rate of flow from without the receptacle and while the doser is in operation.

It may also be desirable to furnish an indication or even to record the capacity of the mechanism to dispense liquid or the rate of discharge at any given time. A mechanical means for so doing, which is of simple construction, is indicated in Figure 1. It comprises a series of slides 70 carried on a bar 71 above the receptacle 1, each of these slides having pivoted thereon an eccentric 72. A member 73 similar to each of the slides 70 is fixed to the slide 71 at one end of the series and to this member 73 is also pivoted an eccentric 72. These eccentrics have eccentricities proportional to the capacity of the corresponding series of dippers, and as shown each is connected to the leg 51 of its controlling valve mechanism by a rod 74 having a spring 75 interposed in its length. This rod 74 is pivoted at 76 to the corresponding disk 72 at the opposite side of its center from its pivotal axis 77, so that when the corresponding leg 51 is lowered to its operative position, the disk is pulled around so that it extends outwardly from its supporting block and pushes against the slide 70 adjacent thereto. The amount of motion which it causes to this adjacent slide 70 is thus proportional to its eccentricity and is thus proportional to the capacity of the series of dippers which have been rendered effective to discharge liquid when the corresponding leg 51 has been moved to its lowered position. In order to provide for inaccuracies in the construction and mounting of the eccentric disk 72, adjustable stop screws 770 and 780 may be provided for limiting the extent of turning movement thereof in opposite directions so that this extent is truly proportional to the capacities of the series of dippers controlled by movement of the corresponding leg 51. The spring 75 is interposed in order that the disk may be turned to the same amount regardless of variations in the extent to which the leg 51 is lowered at any particular time, it being only necessary that this leg should be lowered to an amount sufficient to cause the series of dippers controlled thereby to be effective. As the member 73 and the slide 70 are arranged in series along the member 71, it is evident that a slide 78 against which the last disk 72 of the series engages is moved away from the member 73 a distance which is the summation of the eccentricities of all the disks 72 which have been moved to their eccentric positions, the slide 78 being pulled toward the member 73 as far as is permitted by the disks 72 by means such as a weight 80 fixed to a cord 81 passing over a guide pulley 82. When any of the legs 51 is in its raised or inoperative position, the corresponding disk 72 is pulled back by a spring 84, thus permitting all the slides 70 therebeyond to be drawn toward the member 73 by an amount proportional to the capacities of the dippers which have been rendered inoperative. The position of the slide 78 lengthwise of the bar 71 therefore furnishes a direct indication of the operative total capacity of the device to deliver liquid as adjusted at any particular time. This position of the slide 78 may be transmitted to the pen 85 of a recorder 86 by means of the cord 87 attached thereto so that the pen 85 may indicate on the recorder chart 88 the capacity of the mechanism as adjusted at any time.

In place of the mechanical recorder an electrical recorder such as shown in Figure 2 may be used. The legs 51 are each connected through a cord or wire 90 with one end of an arm 91 pivoted at 92 to a fixed member 93, the opposite end of each of the arms 91 having a weight 94 thereon so that the weighted end is normally urged downwardly out of contact with an electrical contact segment 95. Whenever the leg 51 is lowered to its operative position, the corresponding arm 91 is swung upwardly into contact with its segment so as to establish electrical connection through the arm 91, the segment, and a resistance such as R1, R2, R3 and R4, between a generator 97 and an ammeter 96 in series with the segment 95, these resistances being arranged in parallel. The resistances R1, R2, R3, R4, etc. are reciprocally proportional to the capacities of the corresponding series of dippers so that the ammeter reading is proportional to the number of series of dippers which are in active condition at any time, the generator voltage being constant. If the generator 97 is carried by the shaft 4 as shown in Figure 2 any variation in speed of the shaft 4 will also be effective to vary the voltage of the generator which will thus modify the ammeter reading so that the ammeter reading discloses the rate of discharge of the device which is due not only to the number of dippers effective at any one time, but also to their frequency of discharge, this being proportional to the speed of rotation of the shaft 4. If the ammeter 96 is of the recording type, a record will be made of the discharge of liquid continuously. This mechanism also has the advantage that it indicates or records the actual rate of discharge rather than merely its adjustment for discharge rate if actuated at a predetermined constant speed, as in the case of the mechanical recorder.

Of course either of the recorders shown may be used in connection with any type of control mechanism for rendering any series of dippers ineffective to discharge liquid. The baffle construction shown in Figure 8 is illustrated in connection with the electrical recording mechanism shown more particularly in Figure 2. It will be seen that the arm 91 corresponding to the particular series of dippers is connected by means of a cord 98 passing about suitable guide pulleys to an arm 99 extending from a portion of the baffle or cover 60, so as this cover is moved to cover the funnel the arm 91 is allowed to drop off from the segment 95, and as the cover is moved to uncover the funnel and permit the dippers to be effective in measuring out liquid the arm 91 is drawn up into contact with its segment.

The term "liquid" as used in this application is intended to include any material sufficiently fluent to be handled by a device of the doser type.

Having thus described certain embodiments of this invention, it will be evident to those skilled in the art that various changes and modifications might be made therein without departing from its spirit or scope, as defined by the appended claims.

I claim:

1. A mechanism of the class described comprising a receptacle for containing a liquid, a shaft extending horizontally over the surface of the liquid in said receptacle, dippers arranged in circular series about said shaft in a manner successively to dip up liquid from said receptacle and discharge such liquid as said shaft is rotated, a trough into which the liquid is discharged, means for supplying liquid to said receptacle, and means for cleaning the interior of each dipper before each filling movement thereof.

2. A mechanism of the class described comprising a receptacle for containing a liquid, a shaft extending horizontally over the surface of the liquid in said receptacle, dippers arranged in circular series about said shaft in a manner successively to dip up liquid from said receptacle and discharge such liquid as said shaft is rotated, a trough into which the liquid is discharged, means for supplying liquid to said receptacle, and means for projecting liquid from said receptacle into each dipper while it is in inverted position prior to dipping liquid from said receptacle.

3. In a mechanism of the class described, a receptacle for containing a liquid, a horizontal shaft extending across said receptacle above the level of liquid therein, a plurality of series of dippers, each series being arranged in circular formation about said shaft and in position for the dippers of each series to dip successively beneath the liquid in said receptacle and then discharge the liquid so dipped up, a funnel for receiving the liquid discharged from the dippers of each series, means for receiving liquid from the several funnels, and means for selectively rendering inoperative to deliver liquid to said receiving means the dippers of each series.

4. In a mechanism of the class described a receptacle for containing a liquid, a horizontal shaft extending across said receptacle above the level of liquid therein, a plurality of series of dippers, each series being arranged in circular formation about said shaft and in position for the dippers of each series to dip successively beneath the liquid in said receptacle and then discharge the liquid so dipped up, a funnel for receiving the liquid discharged from the dippers of each series, means for receiving liquid from the several funnels, and means for covering any one or more of said funnels to prevent liquids discharging from the corresponding dippers from passing to said receiving means.

5. In a mechanism of the class described, a receptacle for containing a liquid, a shaft extending horizontally across said receptacle, dippers arranged in a plurality of circular series about said shaft in a manner to dip up and discharge liquid from said receptacle as said shaft is rotated, funnels for receiving the liquid discharged from the dippers of each series, a trough for receiving the liquid from each of said funnels, means for rendering any of said funnels inoperative at will for delivering liquid to said trough, and means responsive to the conditions of said inoperative rendering means for indicating the total capacity of said mechanism at any instant.

6. In a mechanism of the class described, a receptacle for containing liquid, dippers, means for causing each dipper to alternately dip up liquid from said receptacle and to then discharge said liquid, means for receiving the discharge from said dippers, and means actuable from without said receptacle for rendering various numbers of said dippers inoperative to deliver liquid to said receiving means whereby to regulate the rate of discharge of said liquid from said mechanism.

7. In a mechanism of the class described, a receptacle for containing liquid, dippers, means for causing each dipper alternately to dip up liquid from said receptacle and to then discharge said liquid, means for receiving the discharge from said dippers, and means actuable while the mechanism is in operation for rendering various numbers of said dippers inoperative to deliver liquid to said receiving means whereby to regulate the rate of discharge of said liquid from said mechanism.

8. In a mechanism of the class described, a receptacle for containing liquid, dippers arranged in a plurality of series, means for causing each dipper alternately to dip up liquid from said receptacle and to then discharge said liquid, means for receiving the discharge from said dippers, and means actuable to simultaneously render all the dippers of any one series inoperative to deliver liquid to said receiving means.

9. In a mechanism of the class described, a receptacle for containing liquid, dippers arranged in a plurality of series, means for causing each dipper to alternately dip up liquid from said receptacle and to then discharge said liquid, means for receiving the discharge from said dippers, means for rendering various numbers of said dippers inoperative to deliver liquid to said receiving means whereby to regulate the rate of discharge of said liquid from said mechanism, and means responsive to said inoperative rendering means for indicating the rate of discharge.

10. In a mechanism of the class described, a receptacle for containing liquid, dippers arranged in a plurality of series, means for causing each dipper to alternately dip up liquid from said receptacle and to then discharge said liquid, means for receiving the discharge from said dippers, a member associated with each of the groups of said dippers and movable between a position in which the dippers of its group are effective to discharge liquid into said receiving means and a position in which the dippers of its group are ineffective to discharge liquid into said receiving means, an indicator, and means responsive to the positions of said members for controlling said indicator.

11. In a mechanism of the class described, a receptacle for containing liquid, groups of dippers, the dippers of each group being arranged to successively dip beneath the liquid in said receptacle to remove a quantity therefrom, and then to discharge said quantity, means for receiving the liquid so discharged, a rotary shaft for actuating said dippers, a member associated with each group of dippers and movable between a position where the dippers of its group are effective to discharge into said receiving means and a position where the dippers of its group are ineffective to discharge into said receiving means, a generator driven from said shaft, an ammeter, and a resistance proportional to the reciprocal of the capacities of the dippers of each group closing the circuit between said generator and ammeter only when the movable member associated with the corresponding group is in such position that the dippers of that group are effective to discharge into said receiving means.

12. In a mechanism of the class described, a receptacle for containing liquid, groups of dippers arranged to remove liquid from said receptacle and to discharge such liquid, means for receiving the liquid so discharged, means for rendering the dippers of any group ineffective to discharge into said receiving means, and means responsive both to the capacity of all the dippers effective to discharge into said receiving means and their frequency of discharge for indicating the rate of discharge to said receiving means.

13. In a mechanism of the class described, a receptacle for containing liquid, dippers, means for causing each dipper alternately to dip up liquid from said receptacle and to then discharge said liquid, means for receiving the discharge from said dippers, and means for varying the capacity of said mechanism to deliver liquid by definite increments, said means being actuable while said mechanism is in operation, said mechanism including means operative while said mechanism is in operation for actuating said varying means.

14. In a mechanism of the class described, a receptacle for containing liquid, dippers, means for causing each dipper alternately to dip up liquid from said receptacle and to then discharge said liquid, means for receiving the discharge from said dippers, and means actuable while the mechanism is in operation for rendering various numbers of said dippers inoperative to deliver liquid to said receiving means whereby to regulate the rate of discharge of said liquid from said mechanism, each of said dippers being formed to dip up the same quantity of liquid regardless of substantial changes of level in said receptacle.

15. In a mechanism of the class described, a receptacle for containing liquid, groups of dippers arranged to remove liquid from said receptacle and to discharge such liquid, means for receiving the liquid so discharged, means for rendering the dippers of any group ineffective to discharge into said receiving means, and means responsive both to the capacity of all the dippers effective to discharge into said receiving means and their frequency of discharge for indicating the rate of discharge to said receiving means, each of said dippers being formed to dip up the same quantity of liquid regardless of substantial changes of level in said receptacle.

16. In a mechanism of the class described, a plurality of discharge means having capacities each differing from that of each of the others by a power of two, and means for selectively rendering any one or more of said means ineffective to discharge from said mechanism.

17. In a mechanism of the class described, a receptacle for containing liquid, dippers arranged in a plurality of series, means for causing each dipper alternately to dip up liquid from said receptacle and then to discharge said liquid, the dippers of each series having a combine capacity differing from the total capacity of the dippers of each other series by a power of two, and means for causing all of the buckets of any selected of said series to be inoperative to discharge from said mechanism.

In testimony whereof I have affixed my signature.

MILTON O. SCHUR.